May 9, 1967 — F. R. MARX ET AL — 3,318,527
STEAM TRAPS

Filed Aug. 3, 1964 — 2 Sheets-Sheet 1

INVENTORS
FRANK RALPH MARX
TIMOTHY JOHN BURRETT
BY
Davis, Hoxie, Faithfull & Hapgood
ATTORNEYS.

May 9, 1967  F. R. MARX ETAL  3,318,527
STEAM TRAPS
Filed Aug. 3, 1964
2 Sheets-Sheet 2

INVENTORS
FRANK RALPH MARX
TIMOTHY JOHN BURRETT
BY
Davis, Hoxie, Faithfull & Hapgood
ATTORNEYS

United States Patent Office 3,318,527
Patented May 9, 1967

3,318,527
STEAM TRAPS
Frank Ralph Marx, Cheltenham, and Timothy John Burrett, Bagendon, near Cirencester, England, assignors, by mesne assignments, to Sarco Company, Inc., New York, N.Y., a corporation of New York
Filed Aug. 3, 1964, Ser. No. 397,053
Claims priority, application Great Britain, Aug. 2, 1963, 30,831/63
6 Claims. (Cl. 236—59)

This invention relates to steam traps.

According to the present invention there is provided a steam trap comprising a chamber and a valve for controlling escape of fluid from the chamber, the valve having an operating member which in use is arranged to be subjected, in the valve opening direction, to a force dependent on the pressure of fluid in the chamber and, in the valve closing direction, to a force applied thereto by a temperature-responsive means disposed in the chamber, the force applied by the temperature-responsive means increasing with increasing temperature in the chamber, the temperature-responsive means including at least one bimetallic element which deflects when the temperature in the chamber is increased, each element being a single integral member which is shaped and arranged such that with increasing temperature and pressure in the chamber, more portions, or an increased proportion of the element become(s) effective to apply a closing force on the valve.

Figure 1:
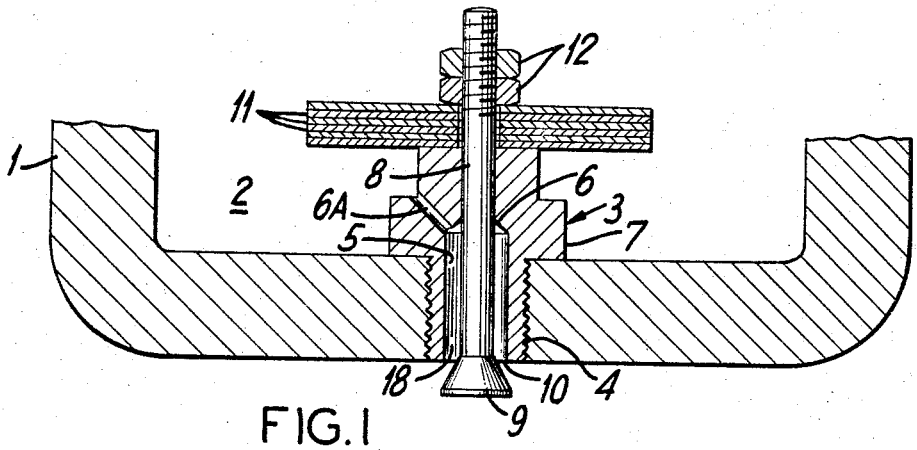
Figure 2:
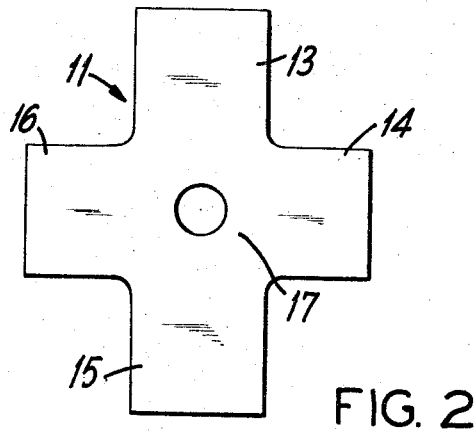
Figure 3:
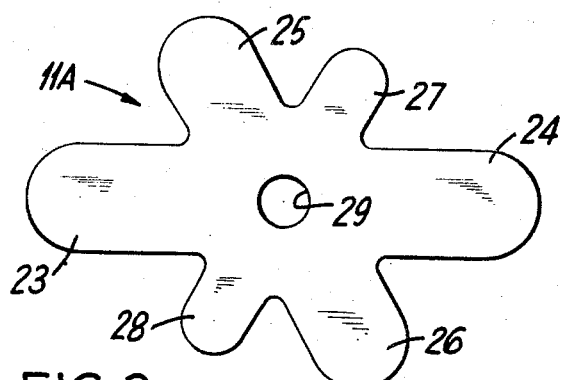
Figure 4:
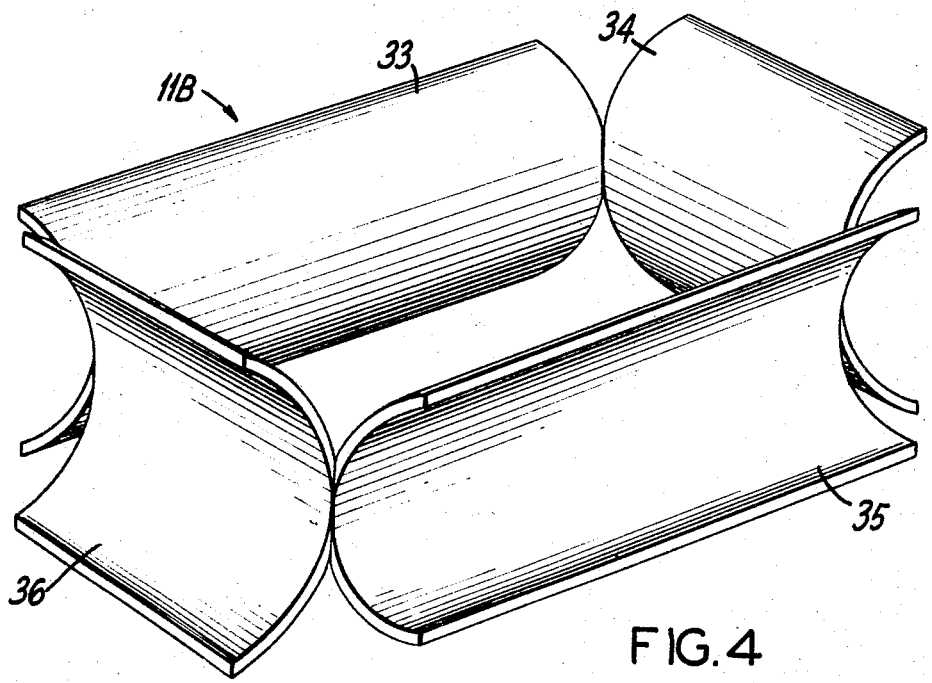
Figure 5:
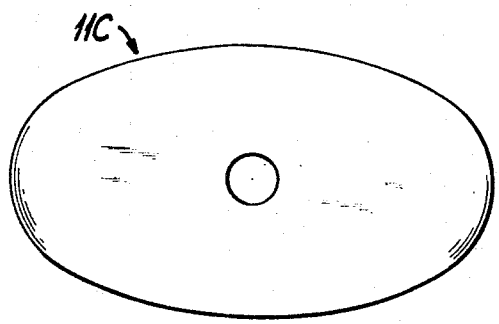
Figure 6:
Figure 7:
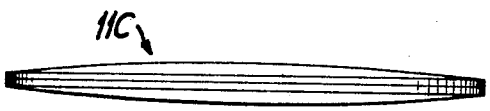
Figure 8:
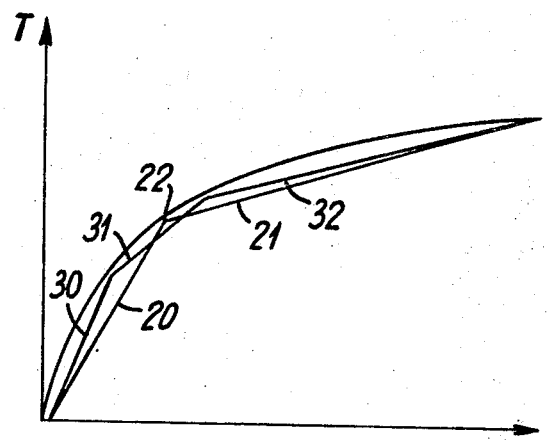

For a better understanding of the invention and to show how the same may be carried into effect, reference will now be made, by way of example, to the accompanying drawings, in which:

FIGURE 1 is a sectional elevation of part of a steam trap,

FIGURE 2 is a plan view of a bimetallic element employed in the trap of FIGURE 1, FIGURE 3 is a plan view of an alternative form of bimetallic element, FIGURE 4 is a perspective view of a further form of bimetallic element, FIGURE 5 is a plan view of a still further form of bimetallic element, FIGURE 6 is a side view of two elements of FIGURE 5 in a first operative condition, FIGURE 7 is a view similar to FIGURE 6 but showing the bimetallic elements in a second operative condition, and FIGURE 8 is a graph indicating relationships between temperature T and pressure P.

The steam trap of FIGURE 1 has a casing 1 only the bottom part of which is shown in FIGURE 1. The casing 1 encloses a chamber 2 which is connected to a steam system (not shown). A cylindrical member 3 is secured by screwthreading in a hole 4 through the bottom wall of the casing 1. The cylindrical member 3 has a vertical bore 5 therethrough, the bore being of reduced diameter near the top of the cylindrical member 3 and a shoulder 6 being formed where the change in diameter takes place. A hexagonal flange 7 is formed on the outside of the cylindrical member. A port 6A extends from the bore 5 at a location just below the shoulder 6 to the exterior of the cylindrical member 3 at a position above the flange 7. A valve stem 8 is disposed in the bore 5, the stem 8 being a sliding fit in the reduced diameter portion of the bore 5. The lower end of the stem 8 carries a frusto-conical valve head 9 which co-operates with a seat 10 formed at the lower end of the bore 5. The upper end of the stem 8 projects upwardly from the top of the cylindrical member and has thereon a pile of bimetallic elements 11 and nuts 12 for holding the assembly together. The bimetallic elements are of the same size and shape and each bimetallic element 11 is, as shown in FIGURE 2, in the form of a cross having arms 13, 14, 15 and 16. The arms 13 and 15 are of equal length as are the arms 14 and 16, the arms 13 and 15 being longer than the arms 14 and 16. The arms 13 and 15 and the central part 17 of the element form a first beam and the arms 14 and 16 and the central part 17 form a second beam, the first beam being longer than the second beam. When the bimetallic element is heated both beams deflect, becoming arcuate shaped, the concave sides of both beams being on the same side of the element. The elements 11 are series-stacked on the stem 8. That is to say, they are mounted on the stem 8 in pairs arranged so that on heating, the central parts 17 of the two elements 11 of each pair are forced away from each other.

It will be understood that as the elements 11 are within the chamber 2, they are in communication with the steam system to which the casing 1 is connected. With the chamber 2 in a cold condition, the elements 11 are flat as shown in FIGURE 1. The lowest element 11 rests on top of the cylindrical member 3 and the lower nut 12 rests on the top element 11, the valve head 9 being spaced from its co-operating seat 10. Thus the chamber 2 communicates via the port 6A, the space 18 that is between the stem 8 and the wall of the bore 3, and the seat 10 with atmosphere. Upon the chamber 2 becoming hot, the elements 11 deflect, becoming alternately concave and convex uppermost, the lowermost element 11 becoming concave upwardly and the uppermost element convex upwardly. The free ends of the arms 13 and 15 of each element 11 remain in contact with the free ends of the arms 13 and 15 of the other element 11 of the same pair but the free ends of the arms 14 and 16 of each element become spaced from the free ends of the arms 14 and 16 of the other element of the pair. This occurs because the beam that includes the arms 13 and 15 is longer than the beam that has the arms 14 and 16 so that the free ends of the arms 13 and 15 deflect to a greater extent than the free ends of the arms 14 and 16. It will be understood that the deflection of the elements 11 causes the nuts 12 and the stem 8 to rise whereby the head 9 eventually closes the valve seat 10 and communication between the chamber 2 and atmosphere is prevented. The pressure of the fluid within the chamber 2 sets on the frusto-conical valve head 9 and tends to urge the stem 8 downwardly against the action of the arms 13 and 15 of the elements 11. With continuing increase of temperature the upward force on the stem 8 arising from the beams that have the arms 13 and 15 increases to oppose the downward force on the stem 8 arising from the fluid pressure acting on the valve head 9. Eventually with increasing temperature the free ends of the arms 14 and 16 of each element 11 encounter the free ends of the arms 14 and 16 of the other element 11 of the same pair. The parameters of the bimetallic elements 11 in relation to the effective area of the valve head 9 against which the fluid in the chamber 2 operates are chosen such that the valve will open when the temperature in the chamber 2 is lower than a predetermined amount below that corresponding to the temperature of saturated steam at the pressure prevailing in the chamber. When the temperature in the chamber 2 is higher than the predetermined amount below that corresponding to the temperature of saturated steam at the pressure prevailing in the chamber the valve is shut. The curve 19 (FIGURE 8) of temperature against saturation pressure for steam is a smooth curve which rises with increasing pressure, the rate of increase of temperature decreasing with increasing pressure. That is to say, the curve is concave downwards. The curve through the points corresponding to the various pressures and temperatures at which the valve opens consists of a first straight line 20 of steep slope and a second straight line 21 of somewhat smaller slope, the point 22 at which the two straight lines 20, 21 join corresponding to that at which, with increasing temperature, the free ends of the arms 14 and 16 of the various elements 11 come into contact with each other so that these arms become operative for applying a force to the stem 8. Said parameters are so chosen that the intersection point 22 of the two straight lines 20, 21 brings the two straight lines 20, 21 as close as practicable to the underside of the steam saturation pressure/temperature curve 19.

Instead of making the beam that has the arms 13 and 15 of a length different from that of the beam having the arms 14 and 16, the same steam trap characteristic as is indicated by the lines 20 and 21 can be obtained by making the two beams of the same length with the arms 13 and 15 of a thickness different from that of the arms 14 and 16. Furthermore, each element 11 may be formed from two rectangular shaped plates welded together to form the cross shape.

FIGURE 3 shows another form of bimetallic element that can be used in place of each of the elements 11 in the steam trap of FIGURE 1. The element 11A of FIGURE 3 is formed from sheet material and in effect has three crossed beams, viz. a long beam that includes arms 23 and 24, an intermediate length beam that has arms 25 and 26 and a short beam that has arms 27 and 28. A hole 29 is formed at the common centre of the three beams and the stem 8 passes through the holes 29 of the several pairs of elements 11A that replace the pairs of elements 11. The two elements 11A of each pair are mirror images of each other having regard to the materials of construction. The elements 11A are of the same size and shape and are stacked with all the arms 23 in alignment so that all the other arms are also in alignment. The elements 11A are constructed so that when they are heated the beams of each element deflect in the same direction, the concave side of each element facing the concave side of the other element of the same pair.

It will be understood that in use of the trap having the elements 11A the operation of the valve constituted by the bend 9 and seat 10 is upon rising temperature initially controlled by the co-operating arms 23 and the co-operating arms 24 of the pairs of elements 11A, the arms 25 to 28 of each element 11A being out of contact with the arms 25 to 28 of the other element 11A of the pair. As the temperature and pressure of the fluid in the chamber 2 increase the arms 25 and 26 become effective when their free ends touch each other and eventually the arms 27 and 28 become effective. The curve through the points corresponding to the various pressures and temperatures at which the valve opens consists of (i) a first straight line 30 of steep slope and which corresponds to operation of the valve in which the long beams having the arms 23 and 24 are effective, whereas the shorter beams having the arms 25 to 28 are not effective, (ii) a second straight line 31 of smaller slope where the intermediate beams having the arms 25 and 26 become effective in addition to the long beams having the arms 23 and 24, and (iii) a straight line 32 of still smaller slope where all the arms 23 to 28 are effective in applying force to the stem 8.

FIGURE 4 illustrates a bimetallic element 11B that can be employed in the trap of FIGURE 1 to replace all the elements 11. The element 11B is of rectangular form in plan view having four sides 33, 34, 35 and 36. Each side 33 to 36 is arcuate in vertical section, the concave surface of each side facing outwardly. The central part of the end of each side 33 to 36 is joined to the central part of the adjacent end of the adjacent side. The sides 34 and 36 are of the same height and length as are the sides 33 and 35, the sides 34 and 36 being shorter and taller than the sides 33 and 35. The bimetallic element 11B is formed so that when it is heated the sides 33 to 36 become less curved, i.e., they become flatter and taller. The element 11B can be fitted between two parallel horizontal plates (not shown) the lower one of which rests on top of the cylindrical member 3, the element 11B resting on this lower plate, the upper plate resting on the element and the lower nut 12 bearing on top of the upper plate. If desired, however, the lower plate can be omitted and the element 11B disposed around the upper part of the cylindrical member 3, the lower edges of the sides 33 to 36 resting on the bottom wall of the casing 1.

In use of the trap fitted with the element 11B, the upper plate initially rests on the upper edges of the taller sides, i.e., the sides 34 and 36, and is clear of the upper edges of the sides 33 and 35. Thus at lower temperatures and pressures the sides 33 and 35 are inoperative so far as having any effect on the characteristics of the steam trap are concerned. For higher temperatures and pressures, however, all four sides 33 to 36 bear on the underside of the upper plate and apply force to the valve stem 8. Thus the trap has the same kind of operating characteristic as that of the trap of FIGURES 1 and 2. That is to say, it has a response indicated by the lines 20 and 21 in FIGURE 8.

In a modified form (not shown) of the bimetallic element of FIGURE 4 the four sides may be concave inwardly instead of outwardly. Furthermore, instead of two pairs of sides the element may have three or more pairs of sides, the pairs coming successively into operation with increasing temperature and pressure. In a case where the sides are concave inwardly they may be constructed such that the curvature thereof increases with increasing temperature, the upper edges of said sides extending over the edges of a first horizontal plate member supported from the top of the casing 1 and the lower edges of said sides extending under the edges of a second horizontal plate member carried on the upper end of the stem 8, the arrangement being such that with increasing temperature and pressure in the casing 1, the pairs of opposite sides of the bimetallic element successively engage the first and second horizontal members to apply valve closing forces on the valve.

FIGURE 5 illustrates another form of bimetallic element that can replace each of the elements 11 of FIGURES 1 and 2. The element 11C of FIGURE 5 is oval or elliptical in plan view. The trap is provided with a plurality of pairs of the elements 11C, the elements 11C being of identical shape and having their peripheries in alignment. When heated the elements 11C become dished, the concave sides of the elements of each pair facing each other. Initially only the peripheral portions at opposite ends of the major axis of each element 11C touch corresponding portions of the other element of each pair. As the temperature and pressure in the chamber 2 increase the forces acting in opposite directions on the valve stem 8 increase and the extent of peripheral contact of the elements 11C of each co-operating pair progressively increase until eventually at maximum design temperature the whole of the periphery of each element 11C is in contact with the whole of the periphery of the co-operating element of the same pair as shown in FIGURE 7. FIGURE 6 shows an intermediate stage of peripheral contact of a pair of elements 11C. By suitably selecting the parameters of the elements 11C the response curve of the steam trap fitted with the elements 11C can be made to follow a smooth curve that is substantially the same as the steam saturation curve 19.

It will be understood that when the steam trap has elements 11, 11A or 11C, provision is made for preventing the individual elements from rotating relative to each other.

Having thus fully described the invention, what we claim as new and desire to secure by Letters Patent is:

1. A steam trap comprising a chamber and a valve for controlling escape of fluid from the chamber, the valve having an operating member which in use is arranged to be subjected, in the valve opening direction, to a force dependent on the pressure of fluid in the chamber and, in the valve closing direction, to a force applied thereto by a temperature-responsive means disposed in the chamber, the force applied by the temperature-responsive means increasing with increasing temperature in the chamber, wherein the temperature-responsive means includes a pile of bimetallic elements, the elements being arranged in pairs and such that the elements of each pair become concave towards each other upon heating thereof, and wherein each element is in the form of a plurality of crossed beams, the beams being of a different length one from another and the elements being of the same size and shape and orientated so that in the pile, beams of the same length are in alignment.

2. A steam trap comprising a chamber and a valve for controlling escape of fluid from the chamber, the valve having an operating member which in use is arranged to be subjected, in the valve opening direction, to a force dependent on the pressure of fluid in the chamber and, in the valve closing direction, to a force applied thereto by a temperature-responsive means disposed in the chamber, wherein the temperature-responsive means includes a pile of bimetallic elements of the same size and shape and arranged in pairs such that upon heating the elements of each pair become concave towards each other, and wherein each element is in the form of a plurality of crossed beams, the beams being of the same length but different thicknesses one from another and the elements in the pile being orientated such that beams of the same thickness are in alignment.

3. A steam trap comprising a chamber and a valve for controlling escape of fluid from the chamber, the valve having an operating member which in use is arranged to be subjected, in the valve opening direction, to a force dependent on the pressure of fluid in the chamber and, in the valve closing direction, to a force applied thereto by a temperature-responsive means disposed in the chamber, wherein the temperature-responsive means includes a pile of bimetallic elements of the same size and shape and which are arranged in pairs such that upon heating the elements of each pair become concave towards each other, and wherein each bimetallic element is of oval form, the elements being arranged in the pile with their peripheries in alignment.

4. A steam trap comprising a chamber and a valve for controlling escape of fluid from the chamber, the valve having an operating member which in use is arranged to be subjected, in the valve opening direction, to a force dependent on the pressure of fluid in the chamber and, in the valve closing direction, to a force applied thereto by a temperature-responsive means disposed in the chamber, wherein the temperature-responsive means has a single bimetallic element in the form of a frame having $2a+2$ sides, where $a$ is an integer, opposite sides being parallel and of the same height and length, each side being of strip form and shaped to be arcuate in a section taken perpendicular to the plane of said frame, the heights of the sides changing with changing temperature and the heights of the pairs of opposite sides being initially different one pair from another and the central part of the end of each side being joined to the central part of the adjacent end of the adjacent side.

5. A trap as claimed in claim 1, wherein said sides are concave outwardly.

6. A steam trap as claimed in claim 1, wherein when the bimetallic element is heated the sides become less curved, i.e., they become flatter and taller.

References Cited by the Examiner

UNITED STATES PATENTS 2,781,173   2/1957   Bahr _____ 236—59

ROBERT A. O'LEARY, *Primary Examiner.*

ALDEN D. STEWART, *Examiner.*